US012682152B2

(12) United States Patent
Hoelzer et al.

(10) Patent No.: US 12,682,152 B2
(45) Date of Patent: Jul. 14, 2026

(54) EXCHANGE OF DATA BETWEEN AN EXTERNAL DATA SOURCE AND AN INTEGRATED MEDICAL DATA DISPLAY SYSTEM

(71) Applicant: Siemens Healthineers AG, Forchheim (DE)

(72) Inventors: Philipp Hoelzer, Tokyo (JP); Alexis Laugerette, Hochstadt a. d. Aisch (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 300 days.

(21) Appl. No.: 17/953,767

(22) Filed: Sep. 27, 2022

(65) Prior Publication Data

US 2023/0100510 A1 Mar. 30, 2023

(30) Foreign Application Priority Data

Sep. 30, 2021 (EP) .................................... 21200319

(51) Int. Cl.
*G06F 40/169* (2020.01)
*G06T 11/60* (2006.01)

(52) U.S. Cl.
CPC ............ *G06F 40/169* (2020.01); *G06T 11/60* (2013.01); *G06T 2210/41* (2013.01)

(58) Field of Classification Search
CPC ........ G16H 30/40; G06V 20/65; G06V 10/44; G06V 10/764; G06V 2201/02; G06F 3/14; G06F 40/169; G06T 11/60; G06T 2210/41
See application file for complete search history.

(56) References Cited

U.S. PATENT DOCUMENTS

| | | | |
|---|---|---|---|
| 9,582,482 | B1 | 2/2017 | Sharifi et al. |
| 9,798,708 | B1 * | 10/2017 | Sharifi ................ G06F 16/5866 |
| 2008/0059238 | A1 * | 3/2008 | Park ....................... G06Q 10/10 |
| | | | 705/3 |
| 2008/0119235 | A1 | 5/2008 | Nielsen et al. |
| 2011/0251483 | A1 * | 10/2011 | Razzaque .............. A61B 6/032 |
| | | | 600/424 |
| 2011/0264709 | A1 * | 10/2011 | Beardsmore ............ G06F 9/451 |
| | | | 707/804 |
| 2014/0123237 | A1 * | 5/2014 | Gaudet ................... G06F 21/60 |
| | | | 726/4 |

(Continued)

OTHER PUBLICATIONS

Merriam: "Merriam Webster Dictionary—term "Append"",, Apr. 1, 2025 (Apr. 1, 2025), XP093268952.

(Continued)

*Primary Examiner* — Michelle L Sams
(74) *Attorney, Agent, or Firm* — Harness, Dickey & Pierce, P.L.C.

(57) ABSTRACT

A method for exchanging data between an external data source for annotations and an integrated medical data display system, comprises: determining information displayed on a screen of the integrated medical data display system by capturing the screen; and performing at least one of (i) selecting data from the external data source assigned to the determined information and displaying the selected data complementary, or (ii) extracting annotations from the integrated medical data display system based on the determined information and appending the extracted annotations to the external data source for annotations.

18 Claims, 12 Drawing Sheets

(56)        References Cited

U.S. PATENT DOCUMENTS

| | | | |
|---|---|---|---|
| 2015/0379199 A1* | 12/2015 | Tambasco, Jr. ........ | G06V 30/40 |
| | | | 705/3 |
| 2017/0371844 A1* | 12/2017 | Yao ..................... | G06F 3/04883 |
| 2019/0274640 A1* | 9/2019 | Mukasa ............... | A61B 5/7425 |
| 2020/0034411 A1* | 1/2020 | Soon-Shiong ......... | G06Q 30/02 |

OTHER PUBLICATIONS

Merriam: "Merriam Webster Dictionary—term "Annotation"",, Apr. 1, 2025 (Apr. 1, 2025), XP093268951.

* cited by examiner

FIG 14

EXCHANGE OF DATA BETWEEN AN EXTERNAL DATA SOURCE AND AN INTEGRATED MEDICAL DATA DISPLAY SYSTEM

CROSS-REFERENCE TO RELATED APPLICATION(S)

The present application claims priority under 35 U.S.C. § 119 to European Patent Application No. EP 21200319.8, filed Sep. 30, 2021, the entire contents of which are incorporated herein by reference.

FIELD

One or more example embodiments of the present invention relate to a method for exchanging data between an external data source for annotations and an integrated medical data display system. One or more example embodiments of the present invention also concern a data exchange device for exchanging data between an external data source and an integrated medical data display system. Further, One or more example embodiments of the present invention relate to an AI-based data analysis system.

BACKGROUND

AI-based applications (AI=artificial intelligence) are more and more widespread in the field of medical assessment, in particular, for medical images (e.g., magnet resonance images, computed tomography images, X-ray images, Single photon-emission computed tomography images, positron emission tomography images, or ultrasound images). However, a broad adoption is currently hindered by IT problems and in particular integration problems. Especially, the lack of standard mechanisms for the display of AI-results and for interacting with them in the PACS (PACS=Picture Archiving and Communication System) and/or the RIS (RIS=Radiology Information System) pushed AI vendors to integrate AI-based applications into PACS and/or RIS using proprietary interface contracts or using their own application typically in an additional application, e.g., a web browser, also called "review screen" or "confirmation screen" or "confirmation UI" (UI=user interface). This last approach presents the challenge of an additional window that most of the time does not behave synchronously with the main PACS-viewer. The user has to perform actions twice. For example, if he scrolls to a particular slice in the PACS viewer, he will also have to redo this operation in the AI confirmation screen. These approaches are not convenient for a proper and effort-less integration of artificial intelligence in radiology and decrease the broad usage of artificial intelligence: It is now well-known that superior routine workflow integration is a key for AI success in medical imaging.

One conventional approach is to develop a product which encompasses a viewer and an AI-tool. A tool comprises a software which enables a computer-aided application of a method, preferably in dialogue operation. Another approach is directed to establish compatibility between both components through a proprietary API (API=Application Programming Interface). General interoperability is guaranteed through established standards and real-time data exchange between the two applications, deep integration via an iFrame-embedded approach or similar.

SUMMARY

In reality, there is a multitude of PACS and AV (AV=Advanced visualization) viewers in use at clinical sites, making it fairly impractical and cost-prohibitive to establish a common interface of deeper integration with every single medical viewer, and especially impractical to use an external application window, also mentioned as confirmation UI, in conjunction with an existing PACS viewer, since both are completely desynchronized.

The inventors have determined that it would be appropriate to develop a solution, which would facilitate the integration and display of such external AI results onto any PACS viewer by making them available in the correct context, i.e. image slice and potentially well-integrated in the main viewing environment, i.e. overlay.

The inventors have also identified a further problem occurring in the above-mentioned scenario, which is the challenge of an additional window that most of the time does not fit well in a chosen default PACS/RIS layout or a layout of an AV viewer, as it hides useful contents. For example, most of the time, the additional window is displayed on the full screen and has to be moved manually, if the position and size is not suitable. Similarly, smaller tools like external toolbars or widgets are usually auto-positioned only at some fixed locations, e.g. the bottom right corner. These approaches are not convenient for a proper and effort-less integration of artificial intelligence in radiology.

As mentioned-above, an approach is to have the viewer and the AI-tool to belong to the same product. Compatibility between both components can be established through a proprietary API, general interoperability can be also guaranteed through established standards, deep integration via an iFrame-embedded approach or similar. However, as also mentioned-above, in reality, there is a multitude of PACS and AV viewers in use at clinical sites, making it fairly impractical and cost-prohibitive to establish a common interface or deeper integration with every single medical viewer, and especially impractical to embed an external application UI (UI=user interface) into an existing PACS/RIS UI (RIS=Radiology Information System) for example, since those approaches are costly and done in very rare cases.

An example for AI-based medical information is the detection and quantification of lesions that bears great potential to reduce reading time of radiological images. This can be achieved by automating away repetitive and manually tedious tasks such as diameter measurements of pulmonary nodules. Given the imperfect performance of AI algorithms, there is however always the need to account for user-added lesions that would have to be tracked as well on follow-up scans. Generally, the user-added lesions are added in the PACS/RIS UI, whereas the confirmation UI is typically not able to access to the user-added lesions. If the software were not able of such functionality, this would come at larger workflow costs. Size sorting between the set of AI-found nodules and those sets with user-added nodules would be inconsistent and target lesions could be different. In such case, the user would have to switch between different tools and take into account AI-found lesions and separately user-added lesions. All workflow improvement would be gone in such a case. It is therefore of utmost importance to capture user-added lesions.

Also the last stated special problem is generally solvable if a viewer and an AI-tool, i.e. a confirmation UI, belong to the same product or compatibility between both component is established through a proprietary API or general interoperability is guaranteed through established standards, or similar. In reality however, there is a multitude of PACS and AV viewers in use at clinical sites, making it fairly impractical and cost prohibitive to establish a common interface with every single medical viewer.

Hence, a general problem underlying one or more example embodiments of the present invention is to improve the exchange of data between an external data source for determination of annotation data, in particular an image processing application, and an integrated medical data display system like a PACS-System.

The before-mentioned problem is solved by a method for exchanging data between an external data source for annotations and an integrated medical data display system, an exchange device for exchanging data between an external data source and an integrated medical data display system, and/or a medical data analysis system according to one or more example embodiments of the present invention.

According to the method for exchanging data between an external data source for annotations, which external data source works preferably AI-based, and an integrated medical data display system, for example a PACS workstation, information, which is displayed on a screen of the integrated medical data display system is determined by capturing the screen. As later discussed in detail, capturing the screen can be implemented by screen capture techniques.

Screen capture techniques can be realized using a so-called screen camera, which comprises a software which generates a digital image or video from a computer screen.

In this context, it is preferred that the external data source for annotation data comprises a preferably AI-based, but not limited thereto, image processing application and its database. As will also be discussed in detail later, the information displayed on the screen of the integrated medical data display system can encompass medical data as, for example, medical images and/or annotations marked by a user. The information can also incorporate formal information, especially layout information, which can be used for finding out an appropriate region on the screen for positioning a window for an external application, for example a user interface window. Further, at least one of the following steps is performed: Data from the external data source assigned to the determined information are automatically selected and the selected data are displayed complementary to the displayed information. That means that the selected data are displayed on positions such that the selected data do not conceal the displayed information. Alternatively or additionally, annotations, preferably annotations added by a user, are extracted from the integrated medical data display system based on the determined information, and the extracted annotations are appended to the external data source for annotation data.

Advantageously the method does not need a strict integration between different systems, which would be not appropriate due to the plurality of different display systems and data source systems.

A tool, for example implemented as a data exchange device, for analysing the retrieved information, preferably runs on-premises, i.e. on the hardware running the integrated medical data display system, for example a workstation, itself.

The method also ensures optimal display of content of external data sources in a confirmation UI, even in third-party PACS/RIS environments and an "embedded look and feel" without manual configuration. Information can be used for a multitude of products of digital health solutions that need to be used in conjunction with other systems, for example viewers or worklists, mainly all products containing a viewer that could benefit in being called up and used in context, such as a system focused on AI-based medical image processing, or a system focused on AI-based decision support for clinical pathways.

Further, the method also ensures optimal display of user interface windows, even in third-party PACS/RIS environments and "embedded look and feel" without manual configuration or complex integration tasks. The method can be used for a multitude of products at digital health applications that need to be used in conjunction with other third-party systems, for example viewers or worklists like AI widgets, result review screens from AI- or post-processing (interactive) applications, etc.

The additional step of extracting annotations from the integrated medical data display system based on the determined information and of appending the detected annotations to the external data source for annotations in combination with an optional step of actively re-training AI-based algorithms for determining (new) annotations, improves or tailors the algorithm performance, for example for the detection of lesions. Further, the method can be used to track suspicious objects or phenomena like lesions over time.

The data exchange device for exchanging data between an external data source for annotation data and an integrated medical data display system, for example a PACS server, according to one or more example embodiments of the present invention, comprises a determination unit for determining information displayed on a screen of the integrated medical data display system by tracking the screen and at least one of the following units: a selection and display unit for selecting data from the external data source assigned to the determined information and displaying the selected data complementary to the displayed information. The selected data are displayed such that the selected data do not conceal the displayed information to the displayed information. Alternatively or additionally, the data exchange device can also comprise an extraction unit for extracting annotations from the integrated medical data display system based on the determined information and appending the detected annotations to the external data source for annotation data. The data exchange device shares the advantages of the method for exchanging data between an external data source for annotation data and an integrated medical data display system according to one or more example embodiments of the present invention.

The preferably AI-based medical data analysis system according to one or more example embodiments of the present invention comprises a remote external data source for storing medical image data, a preferably AI-based evaluation unit for evaluating or processing medical image data, i.e. preferably the external data source for annotation data, an integrated medical data display system for displaying evaluated medical image data and a data exchange device according to one or more example embodiments of the present invention. The medical data display system might comprise a third-party PACS system. The medical data analysis system according to one or more example embodiments of the present invention shares the advantages of the method for exchanging data between an external data source for annotation data and an integrated medical data display system according to one or more example embodiments of the present invention.

The essential components of the data exchange device according to one or more example embodiments of the present invention can for the most part be designed in the form of software components. This applies in particular to the determination unit, the selection and display unit and the extraction unit of the data exchange device, but also parts of the input interfaces. In principle, however, some of these components can also be implemented in the form of software-supported hardware, for example processors or FPGAs or the like, especially when it comes to particularly fast calculations. Likewise, the required interfaces, for example if it is only a matter of transferring data from other software components, can be designed as software interfaces. However, they can also be designed as hardware-based interfaces that are controlled by suitable software. Furthermore, some parts of the above-mentioned components may be distributed and stored in a local or regional or global network or a combination of a network and software, in particular a cloud system.

A largely software-based implementation has the advantage that medical data analysis systems that have already been used, can easily be retrofitted by a software update in order to work in the manner according to one or more example embodiments of the present invention. In this respect, the object is also achieved by a corresponding computer program product with a computer program that can be loaded directly into a memory device of a medical data analysis system, with program sections, in order to carry out all steps of the method according to one or more example embodiments of the present invention, if the program is executed in the medical data analysis system. In addition to the computer program, such a computer program product may contain additional components such as a documentation and/or additional components, including hardware components such as hardware keys (dongles etc.) for using the software.

For transport to the medical data analysis system and/or for storage on or in the medical data analysis system, a computer-readable medium, for example a memory stick, a hard disk or some other transportable or permanently installed data carrier is used on which the program sections of the computer program that can be read in and executed by a computer unit of the medical data analysis system are stored. The computer unit can comprise for example, one or more cooperating microprocessors or the like used for this purpose.

The dependent claims and the following description each contain particularly advantageous embodiments and developments of the present invention. In particular, the claims of one claim category can also be further developed analogously to the dependent claims of another claim category. In addition, within the scope of the present invention, the various features of different exemplary embodiments and claims can also be combined to form new exemplary embodiments.

In a variant of the method according to one or more example embodiments of the present invention the determined information displayed on the screen comprises at least one of the following types of information:
    content of medical data and/or
    formal information about a format of displayed data,
    non-image information, comprising patient metadata or examination metadata.

Content of medical data comprises information describing the subject matter of medical data. Medical data comprise patient data and identification data of the treating doctor. Patient data comprise all personal information related to a patient, determined or acquired or processed or stored in a medical institution.

The format of displayed data comprises information about the shape and size of displayed structures, in particular the windows and sub-windows of the screen.

Patient metadata or examination metadata comprise attributes, used for tagging and categorizing patient data or examination data for fast and efficient searching processes. Patient metadata comprise, for example, an identifier of a patient. Examination metadata, for example, comprise an identifier of a study.

In case the information displayed on the screen comprises content of medical data, for example medical image data, the image data can be specified and personalized. Further, specific annotation data related to the specified and personalized image data, for example annotations related thereto, can be retrieved from the external data source and can be displayed in combination with the medical images, which are currently displayed.

In case the medical data comprise annotations, the annotations can be extracted using the method according to one or more example embodiments of the present invention and added to an external data source, which generates annotations related to the same medical images using artificial intelligence. Annotations comprise notations added to medical image data. Such notations can comprise labels of findings in medical image data (e.g., the location and/or the classification of certain nodules, wherein classification can, e.g., correspond to a level of malignancy or benignancy of the respective nodule) or segmentations of medical image data (e.g., where organs or parts of organs are identified within the medical image date, e.g., for radiation therapy planning or for volumetric measurements).

In an optional step of the method according to one or more example embodiments of the present invention user made annotations and the automatically generated annotations are fused in the external data source. Hence, an analysis of medical images is improved. In a further optional step of the method according to one or more example embodiments of the present invention, the user added annotations are used for (re-)training the preferably AI-based generation of annotations such that the automated analysis of the medical images is improved.

In a variant of the method according to one or more example embodiments of the present invention the determined information displayed on the screen comprises formal information about a format of displayed data, and the formal information comprises a screen layout comprising a screen portion, the screen portion including at least one of a viewport and a delimited screen portion including an image segment; and/or the formal information comprises a user input in the integrated medical data display system.

In case the determined information displayed on the screen comprises formal information, for example information about a screen layout, as for example the locations and borders of displayed viewports, active viewports can be detected and monitor segments of least-interest, i.e. non-active viewports or patient information, that has been looked at already by the user or that is duplicated somewhere else, can be determined. These segments can be used for displaying an external application window, e.g. a widget, a notifier or a confirmation UI. The external application window can be used as user interface for interacting with the external data source on a screen of the integrated medical data display system. The formal information, i.e. formal screen content, can also comprise user input in an image viewer, which may give a hint for a preferably used region on a screen, e.g. regions of "high attention" that might be well-suited to display content which needs visibility.

Non-image information comprising patient metadata or examination metadata may include contextual content from RIS/reporting screens, for example a worklist, a patient's history, etc.

In a further variant of the method according to one or more example embodiments of the present invention, the step of determining information comprises at least one of the following sub-steps:

using a tool capable of screen tracking to capture screen content preferably in real-time, the tool can be used for capturing screen layout and/or user input, detecting, preferably by OCR (OCR=optical character recognition), which study or patient is currently displayed on the screen, for example by monitoring a particular region of the captured screen layout, in which patient ID or an accession number is displayed, or looking for such a data point in the captured screen layout, classifying based on the captured screen layout, which screen portions correspond to which image segments, for example by determining (x,y)-coordinates of bounding boxes defining viewports and, for each classified image segments, identifying which image the user is currently visualizing and is eventually active on, either by analysing the metadata displayed in the corners of the corresponding viewport or by cross correlating the pixel data with a set of images of this patient known by an external application, like the external data source for annotation data, in that context, also the slice number and series of the displayed image can be determined for identification, identifying which window level the user is working with for a particular slice, optionally in order to infer what organs he might be looking at. For example, the lung window, typically W: 1500 L: −600, e.g. grey values centered at −600 HU (HU=Hounsfield units) and with a window width of 1500 HU, would be indicative of the interest of the radiologist in the lungs and not in other organs.

In particular, in the case the step of determining information comprises the substep of classifying based on captured screen layout, which screen portions correspond to which image segments, the determined information displayed on the screen comprises formal information about a format of displayed data, wherein the formal information comprises a screen layout comprising a screen portion, wherein the screen portion comprise at least one delimited screen portion including an image segment.

In this context it has to be mentioned that a screen can be divided in a plurality of delimited screen portions. These delimited screen portions can comprise bounding boxes or viewports as limiting frame. Each of these screen portions can be realised as an image segment, which depicts a special type of images. In particular, an image segment comprises or relates to at least a part of a medical imaging dataset being reviewed by a user. For example, if a three-dimensional DICOM study is to be displayed, an image segment can correspond to a certain two-dimensional cutting plane through the three-dimensional study, or to certain projection of the three-dimensional study (e.g., a maximum-intensity projection), or to a certain rendering result of the three-dimensional study.

OCR, i.e. optical character recognition comprises an electronic conversion of images of printed text into machine-encoded text. OCR can be used for recognizing text on the screen. In this context, OCR can be used to recognise keyword related to information about patient ID or an accession number.

Windowing is the process in which a CT image greyscale component of an image is manipulated via the CT numbers, i.e. the HU values. The brightness of the image is adjusted via the window level. The contrast is adjusted via the window width. The window width is the measure of the range of CT numbers that an image contains.

Generally, the identification of the window level the user is working enables the use of the same window level also in the confirmation UI.

It is envisioned that these operations, for example the correlations, would need to happen preferably in the cloud or in an edge server, but not in workstation, the user is currently using, since these remote systems are preferably the locations having the missing part that has to be correlated: for example, the PACS/workstation shows a slice, and the cloud/edge possesses results for this slice. This implies that the data is transmitted using data-privacy-preserving methods (e.g., pseudomizing the image by replacing identifying metadata like the name of the patient with non-identifying metadata like an identifier number or string that cannot be associated with the patient by the remote system). Upload and download speeds at the site might also be a decisive factor in this choice.

In a further variant of the method according to one or more example embodiments of the present invention, the external data source comprises results, preferably AI results, and the step of selecting the data from the external data source comprises searching the external data source for results which correspond to the determined content and/or filtering the data available results in the external data source, wherein the selected data comprise the results. That means that it is, for example, queried for results for the image series and slice, identified by screen capture on the screen of the integrated medical data display system. In particular, the results, preferably AI results, are results related to the medical images that can be accessed using the workstation.

In a variant of the method according to one or more example embodiments of the present invention, the step of displaying selected data comprises generating an overlay comprising annotations corresponding to the determined information on top of the image (slice) shown on the screen of the integrated medical data display system, but independently of the integrated medical data display system.

The information displayed on the screen of the integrated medical data display system, for example medical image data, can be understood as a first application window. Then the overlay can be realised as a second application window, which is at least partly transparent. The overlay comprises a second application window which is presented in foreground overlapping with the displayed information of the integrated medical data display system. The overlay is registered with the determined information, for example a medical image of the PACS, such that the results depicted by the overlay, for example annotations, are located at the corresponding positions of the displayed information. In particular using a registration enables to adapt the position and size of the overlay to the underlying displayed information. In particular, the overlay is spatially registered with the determined information, e.g., by adapting the position and/or the size of the overlay to match the displayed information.

The overlay can be generated in a way to maximize usability using appropriate colours or styles that make the result well distinguishable from the original image. If the overlay is interactive, then it needs to have the focus. While scrolling on the screen of the integrated medical data display system, for example the PACS, it would potentially also need to have the focus. This might be solvable by adapting the size of the overlay so that scrolling in the background application is enabled, or by implementing an event-forwarding logic to the background program.

Alternatively, an overlapping of the selected data at least partially with the images of the integrated medical data display system can be generated, if no sufficiently suitable region of least interest is found.

In a further variant of the method according to one or more example embodiments of the present invention, the step of displaying selected data comprises showing the selected data in a particular external window that is opened next to the integrated medical data display system. The external window can comprise a result review and visualization screen of an image post-processing application, for example an AI-based image analysis application. This window, similarly to other programs found on computer, might always stay in the foreground and could only be brought back to background or be hidden by an additional button click or toggle.

For example, results shown in this external window can be presented in a "mini viewer" showing results computed by the AI application, or in a "widget" showing list-like textual and iconographic information. For example, if the radiologist is looking at a chest CT in a particular lung window, i.e. with window level and width identified earlier, the application can present only results related to the lungs, e.g. airways, nodules, parenchyma and omit results related to bones, heart and aorta. If the method is obtained at sufficient speed/performance, i.e. near-real-time, the method can offer a synchronized scrolling-like functionality for an external application, which is able to follow the images that a user is looking at on the screen of the integrated medical data display system, for example a PACS. If performance is not met to provide results for the exact same slice that the radiologist is looking at, for example because he is scrolling fast, an inference could still be made for the next findings to show considering, e.g. in which direction the radiologist scrolls through the images. For example, the tool is prepared to show the findings of slice 270, if the radiologist has scrolled through the slices 267-268-269 already.

Overall, the "near real-time" behaviour might be achievable only by using additional techniques, e.g., to reduce the dimensionality of the image without losing information (lossless compression), for example by down sampling or using an autoencoder-based approach. The streaming of the data in general has to be technically optimized, which might result in using only an (on-premises) edge server and not the cloud.

In a further variant of the method according to one or more example embodiments of the present invention, the information displayed on the screen comprises the current layout of reading workplace monitors. That means the information, how many viewports and where on PACS monitors they are positioned and where are metadata shown outside of the viewports like RIS/reporting contents, eventually located on separate non-diagnostic monitors. Such layout information can be retrieved from the determined information by using image processing techniques as later discussed in details. That information can be used for finding out the region on a set of monitors, which is of least interest and can be further used for displaying an interface for interacting with an external data source. In another aspect of one or more example embodiments of the present invention, this can be used to detect regions of highest interest in order to use them to show important content (e.g., to increase the probability of a time-critical information to be seen by the user), or on the contrary to preserve them from any hiding by external windows.

Furthermore, in a variant of the method according to one or more example embodiments of the present invention, the step of determining information comprises determining a corner or locations or borders of the displayed viewports based on the captured layout. This can be done via a learning-based approach, which nowadays would give very good performance as the task is quite easy. Another alternative would be standard image processing techniques like convolutional processing. There are for example well-known specific kernels that enable the detection of horizontal and vertical lines of different width, which would then enable, by thresholding, to retrieve the different viewports. Line detection has been a quite widely researched image processing topic in the past, which is also well mastered. Finally, we could also foresee a configuration setting or some fixed rules. Though this would probably allow for less flexibility in the kinds of layouts the system can deal with. For this to work, one idea could be to use a first screenshot that captures the overall structure of the used screens and then to request the user, using some user interface, to define regions on this image that could be considered "least interest" or viewports for example. This could be done for a set of common layouts that would then be persisted.

In a variant of the method according to one or more example embodiments of the present invention which is related to the version for finding a region on a display of an integrated medical display system the step of determining information comprises:

determining one or more active viewports using mouse activity tracked using screen capture, or determining screen portions not containing image segments, displaying an external application window within the determined screen portion.

These steps can be carried out for finding portions or regions on a screen, which are currently not focused by a user and can therefore be used for positioning a window for an interface between user and external data source.

In a further variant of the method according to one or more example embodiments of the present invention, the step of determining information comprises using a metric to determine at least one screen portion as a "monitor segment of least-interest" based on the determined information. Such a segment can comprise non-active viewports or patient information that has been looked at already or that is duplicated somewhere else. For example, patient information that has been looked at already, are provided with a tag or are displayed in a smaller window for an unambiguous identification of that type of patient information. The variant also comprises the step of displaying an external application window within the determined screen portion.

The metric can be defined such that a small monitor segment is not as interesting as a more extended monitor segment.

However, such a metric can comprise much more complex criteria. These criteria may comprise:

A monitor segment is not interesting in one of the following cases:

it contains only text that is very small, it contains only text that is better visible elsewhere on the screens, because it is displayed there bigger or more centrally, for example, it contains only small images, also called thumbnails, and all of the images are displayed in large version somewhere else on the screen(s).

One of the segments of least-interest, for example a non-active viewport or a non-image segment, can be reserved for displaying at this location an external application window e.g. a widget, a notifier or a result review UI which has potentially been properly resized to fit this space and display correctly for interaction of the user. This way, the user has the feeling that the external application is properly integrated and is enabled to watch all relevant parts of the original images, since the external application does not hide vital portions of the original images.

The successful resizing can be achieved easily with a responsive design of the application and with a resizing of a container window. A container window is an external application window or the box in which it is integrated or the space the external application window takes in a screen.

In another variant of the method according to one or more example embodiments of the present invention, in case several candidate positions are available, the optimal position can be chosen based on at least one of the following techniques:

based on best size fit between the external application window and the monitor segments of least-interest,
  based on aspect ratio fit between the external application window and the monitor segments of least-interest,
  overlapping the integrated medical data display system if no monitor segment of least interest that fits the external application window is found.

In particular, a certain monitor segment of least interest does not fit the external application window if the size (width and/or height) of the certain monitor segment is smaller than the size (width and/or height) necessary for displaying the external application window.

The first technique is related to the amount of the area or length or width of a monitor segment, for example a window or viewport, which may be selected for displaying an external application window.

The second technique concerns the 2D shape of the window selected to display the external application window.

The technique of overlapping can be used in case there is not enough place for displaying the external application window. If the region of least interest is too small, it would be probably better to display the content somewhere else. Hence, content will be displayed bigger, which is an advantage, even if we hide partially middle-interesting content.

The screen capture tool can run on-premises i.e. on the user's workstation. In envisioned scenarios in digital health processes, it is assumed that all communications between this tool and the cloud would be routed through a single port and gateway, because hospitals generally do not like opening a direct internet connection to the cloud from the workstation. However, if tolerated, a simple API call, i.e. from a workstation to the cloud, with direct internet connection, could be envisioned. Initiating an interaction directly from the cloud or the edge server would also be feasible.

The screen capture tool mentioned can be implemented by using a standard library. These libraries typically capture the screen as an image or eventually a video and would allow to stream it "continuously" to the destination of choice. An open-source library like Phantom JS, extended to screens and not only to webpages, could work. Another option would be to rely on something very standardized like the "screen capture API" for which the user would have to "accept" which part of the screen he would like use to monitor, maybe once per session.

Data privacy could be a major concern for this method. It would be probably necessary to apply data-privacy preserving techniques to modify the captured images in order to transmit them to the cloud. For example, a file comprising the captured images is encrypted, before transmitting the file to the cloud and access is restricted to authorized instances, which have a key for decrypting the file comprising the captured images.

The "external application window" could always stay in the foreground and could maybe only be brought back to background or be hidden by an additional button click or toggle that it carries. This way, it would not hinder interaction with the background application, while also enabling interaction in the "external application window".

In a further variant of the method according to one or more example embodiments of the present invention, the step of determining information displayed on a screen of the integrated medical data display system comprises:
  detecting a reference frame based on the information,
  detecting annotations in the reference frame on the determined information.

That means in detail for example the use of a tool capable of screen tracking to capture screen content in real-time. For identifying a reference frame, a frame of reference is preconfigured and autodetected. The reading workflow is usually sufficiently standardized to preconfigure a particular window on a split screen that is always used to annotate series. Alternatively, a particular window could also be autodetected by for example analysing displayed metadata like series descriptions, which are usually displayed as overlays on the images. Further, user markings, typically in a non-white/non-black colour, can be detected based on rgb values (rgb=red green blue). Alternatively, image content can be subtracted from unannotated images to compute a mask of the annotation. Then the position of the detected user markings, i.e. annotations, is determined. Optionally the detected user markings can be sent to remote location and new lesions based on the locations of user markings can be detected by a preferably AI-based processing unit. In that context, new lesions can be automatically detected using the user-added lesions as seed points.

In a special variant of the method according to one or more example embodiments of the present invention, the step of determining position of the detected user markings comprises the determination of a slice number of the detected user marking. That can be realized by detecting displayed metadata using, for example OCR, or by cross-correlating a given slice with every slice of an unannotated image stack.

Further, the coordinates of an annotation mark are determined, which means the determination of relative x- and y-coordinates relative to the frame of reference, i.e. the determination of an x-value and a y-value of a pixel.

In a variant of the method according to one or more example embodiments of the present invention, the step of detecting new lesions based on the detected user markings comprises at least one of the following steps:
  performing segmentation task on full DICOM data for the new lesions,
  performing detection task on full DICOM data for the new lesions,
  performing characterization task on full DICOM data for the new lesions.

Hence, the automatic detection of new lesions can be improved based on the user-added lesions.

The captured annotation could be used as a plausibility validator to present the user only AI findings that he might have missed, e.g. findings for which he has not drawn an annotation already.

BRIEF DESCRIPTION OF THE DRAWINGS

The present invention is explained below with reference to the figures enclosed once again. The same components are provided with identical reference numbers in the various figures.

The figures are usually not to scale.

FIG. 14 shows a schematic view on a medical data analysis system including a data exchange device according to a second embodiment of the present invention.

DETAILED DESCRIPTION

Figure 1:
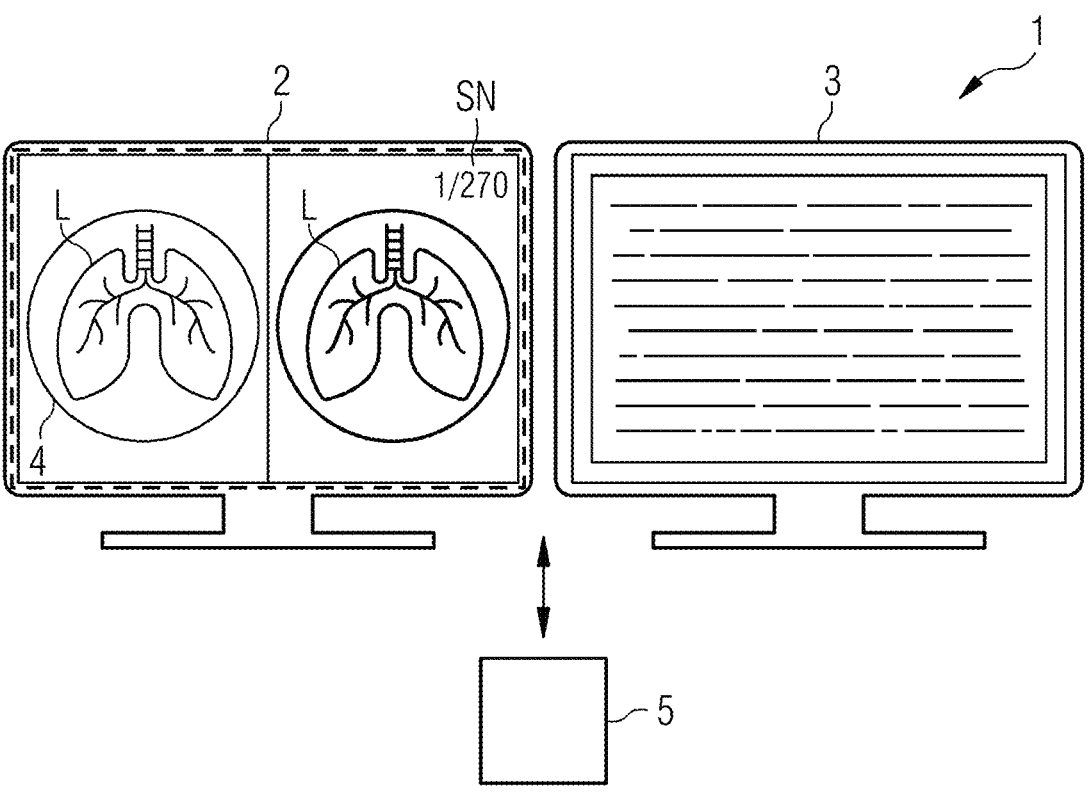
FIG. 1 shows a schematic view on a combination of a PACS screen and a RIS/reporting screen.

In FIG. 1, a schematic view on an integrated medical data display system 1, i.e. a combination 1 of a first screen 2 on the left side, also named image viewer or "PACS monitor", and a second screen 3 on the right side, also named "RIS/reporting monitor", is illustrated. The RIS/reporting monitor 3 is used for displaying mainly non-diagnostic textual information, not containing images, but texts, like patient information, reports, worklists, medical record information, etc. The RIS/reporting monitor 3 is especially used for displaying AI-based determined data. The PACS monitor 2, which is part of a PACS-system (PACS=Picture Archiving and Communication System), comprises a first viewport which is showing a medical image, for example the lung L of a patient, on the left side. On the right side of the PACS monitor 2, the lung L is shown with another windowing setting (window level and window width). For implementing the data exchange method according to a first embodiment of the present invention, a tool is used for tracking the screen of the PACS monitor 2 to capture the screen layout and user input in the screen of the PACS monitor 2, i.e. the image viewer. The mentioned tool runs on-premises, i.e. on the workstation of the PACS monitor 2 itself. Screen capture comprises tracking metadata, like capturing image segments as well as window levels used. In FIG. 1, the window level concerning the illustration of the lung L is detected, for example. Further, it is detected, for example by OCR or other mechanisms or means, which study or patient is currently opened and displayed on the first screen 2. Furthermore, the detection is realized by monitoring a particular region of the captured screen layout in which a patient ID or accession number is displayed, or by looking for such a data point in the captured layout. The second screen on the right side of FIG. 1, i.e. the RIS/reporting monitor 3, is not used yet at the step illustrated in FIG. 1. Further, an external data source 5 is illustrated in FIG. 1, which uses an AI-based application for analysing medical image data received previously and corresponding to the image displayed in the PACS monitor 2 and determines AI-based annotation data based on the received medical image data.

Figure 2:
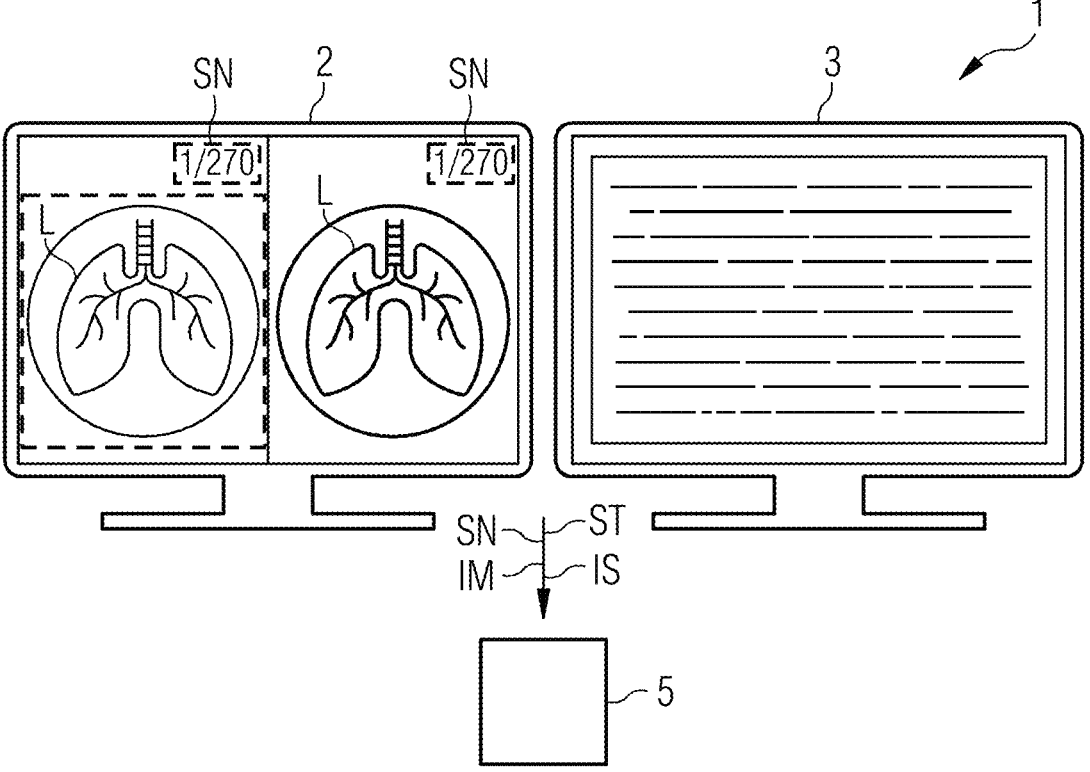
FIG. 2 shows a schematic view on the combination illustrated in FIG. 1, wherein screen capture and cross correlation of pixel data is used to identify which images/series and slice is looked at, FIG. 3 shows a schematic view on the combination of screens illustrated in FIG. 1 and FIG. 2, wherein it is detected on which organ the user is focused, typically based on window levels and widths applied to the image data in the detected viewports, and wherein an external window containing additional results about the detected image is shown in parallel to these images.

FIG. 2 shows a schematic view on the combination 1 of a PACS monitor 2 and a RIS/reporting monitor 3, illustrated in FIG. 1, wherein screen capture and cross correlation of pixel data is used to identify which image, series and slice is looked at. As you can take from FIG. 2, on the left side of the screen of the PACS monitor 2, the window displaying the lung L is segmented by dashed lines and on the left and right side of the screen of the PACS monitor 2 in the upper right corner, a number "1/270", also framed by dashed lines, is detected, which is the slice number of the image slice displayed on the right side of the screen of the PACS monitor 2.

Hence, one viewport on the left side of screen of the PACS monitor 2 contains an image and a slice number in the top right corner and one viewport on the right side contains one image with different window setting and a lice number SN in the top right corner, wherein the slice number SN can be identical to the first one for synchronized scrolling, or different for unsynchronized scrolling.

The second screen, i.e. the RIS/reporting monitor 3 is not used yet at the steps illustrated in FIG. 1 and FIG. 2.

Hence, for each identified image segment IS, it is identified, which image slice SN the user is currently visualizing and is eventually active on, either by analysing the metadata displayed in the corners of this viewport or by cross correlating the pixel data of the first screen, i.e. the PACS monitor 2 with a set of images IM of this patient known by an external AI-based application of an external data source 5.

As it has been still mentioned, it can be also identified with which window level the user is working for this particular slice, in order to infer what organs he might be looking at more precisely. These operations, especially the correlations, are envisioned to happen in the cloud or in an edge server, since these locations in an electronic network are the only locations having the "missing part" that has to be correlated. For example, the PACS monitor 2 shows in an image segment IS a slice with a slice number SN of a series SE of images IM of a study ST and the cloud or the edge server, for example the data source 5, possesses results for this image segment IS and slice SN, and possesses a copy of the full image stack (dataset), allowing the correlation to be performed. In other words, for the image series SE and slice SN and image segment IS identified a database of an AI-based application of an external data source 5 is queried regarding the presence or absence of results for this particular image segment IS and slice SN.

Figure 3:
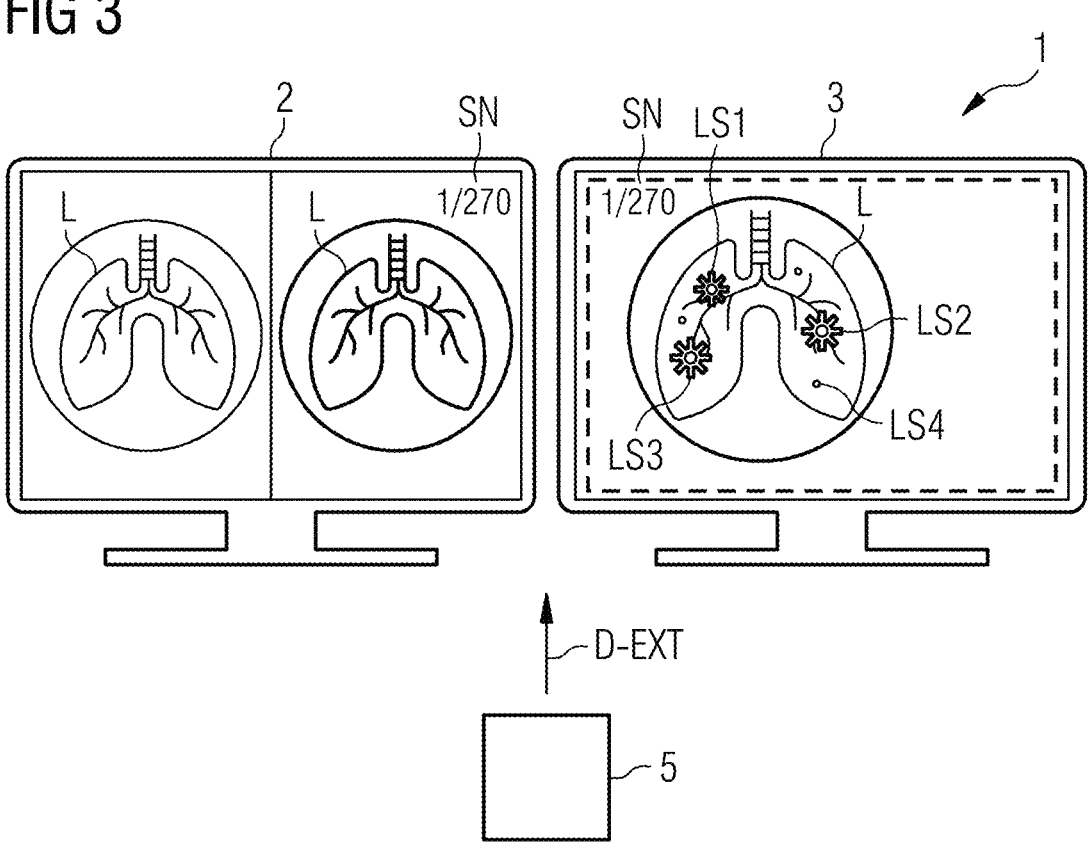

In FIG. 3, a schematic view on the combination 1 of screens 2, 3, illustrated in FIG. 1 and FIG. 2 is shown, wherein based on the detection which slice, assigned to a special slice number SN, and optionally which organ, assigned to an image segment IS, is presently displayed, the corresponding AI-based results are shown on the second screen 3, i.e. the RIS/reporting monitor. The AI-based results are supplied from an external data source 5 which stores AI-based determined annotation data D-EXT.

As you can see in FIG. 3, a plurality of lesions LS1, LS2, LS3, LS4 are signed as annotation data D-EXT in the image of the lung L shown on the second screen 3. Hence, the available results, and only these results corresponding to this slice, are shown in a particular external window on the second screen 3 that is opened next to the PACS viewer 2, i.e. the first screen 2. This second screen 3 can also be named as "result review screen" of an AI application. This window can always stay in the foreground and can maybe only be brought back to background and be hidden by an additional button click or toggle that it carries.

For example, results shown in this external window can be presented in a mini-viewer. For example, if the radiologist is looking at a chest CT in a particular lung window, the application can present only results related to the lungs L, for example airways, nodules, parenchyma, and omit results related to bones, aorta and heart.

If the process of adaption of the display of the AI-based information is obtained at sufficient speed, i.e. near real time, the method might offer a synchronized scrolling-like functionality for an external application, able to follow the images that a user is looking at in the PACS. If looking at these images, an inference could still be made for the next findings to show considering, for example, in which direction the radiologist scrolls through the images. Overall, the near real time behaviour might be achievable only by using additional techniques, for example, to reduce the dimensionality of the (captured) image without losing information, for example by down sampling or using an autoencoder-based approach. The streaming of the data in general has to be technically optimized, which might result in using only an edge server and not the cloud.

Figure 4:
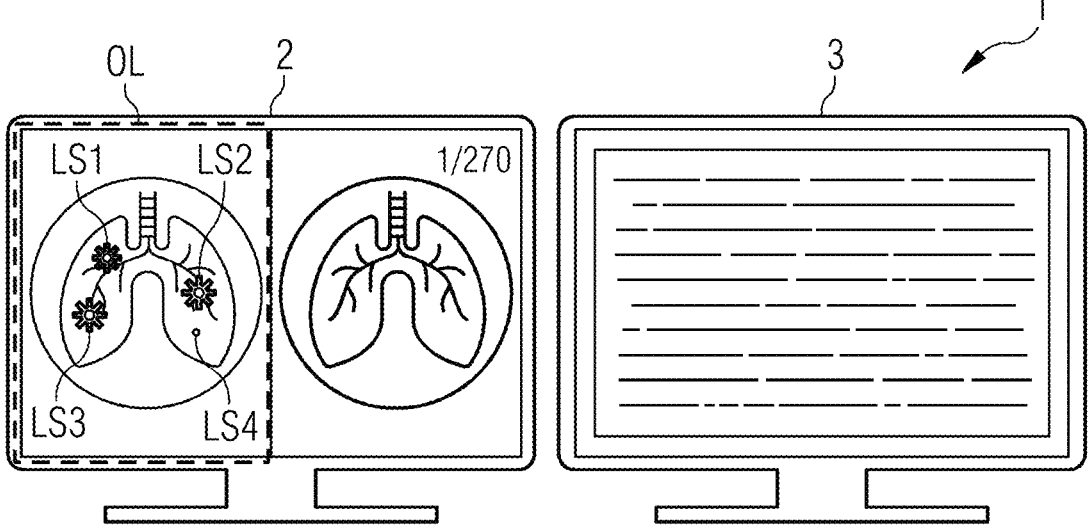
FIG. 4 shows a schematic view on the combination of screens illustrated in FIG. 1 to FIG. 3, wherein an overlay is generated by a tool, which is not part of the PACS.

In FIG. 4, a schematic view on an alternative scenario of the combination of screens 2, 3 illustrated in FIG. 1 and FIG. 2 is shown, wherein an overlay OL is generated by a tool, which is not part of the PACS, on the first screen 2. That means that the AI-based results, i.e. the annotations of the lesions LS1, LS2, LS3, LS4, are shown with an overlay OL generated by the tool, i.e. the data exchange device 60 (shown in FIG. 6), which overlay OL is not part of the PACS, but is implemented as a "fake" overlay, ensuring editability "in" the PACS monitor 2 and interaction with the result without a deeper PACS integration. In other words, an overlay OL on top of the slice shown in the PACS monitor 2 is generated by the data exchange device 60, corresponding to the result, that would enable real-time interaction between the result object "in context", though the result object is not a part of the PACS itself. The overlay OL can be generated in a way to maximize usability, for example using appropriate colours and styles that make the result well distinguishable from the original image. If the overlay OL is interactive, then it needs to have the focus on the overlay OL also while scrolling in the PACS. This might be solvable by adapting the size of the overlay OL, so that scrolling in the background application is enabled, or by implementing an event-forwarding logic to the background program.

Figure 5:
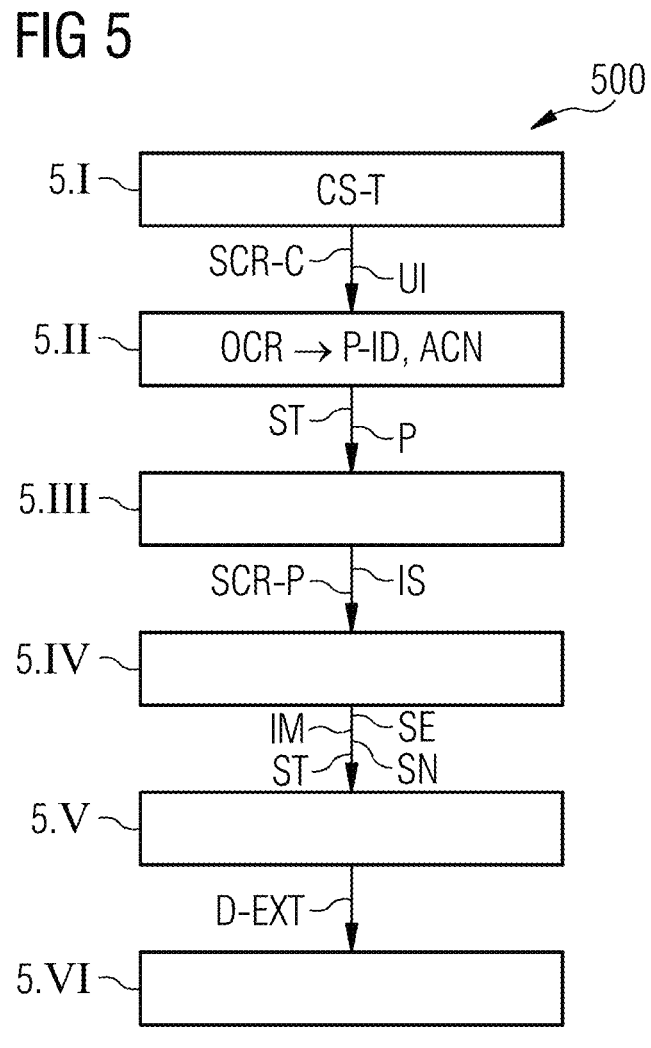
FIG. 5 shows a flow chart diagram illustrating the method for exchanging data between an external data source for annotation data and an integrated medical data display system according to an embodiment of the present invention.

FIG. 5 shows a flow chart diagram 500 illustrating the method for exchanging data between an external data source 5 for annotation data and an integrated medical data display system 1 according to a first embodiment of the present invention, wherein an adaption of data of an external data source to an integrated medical data display system is carried out.

In step 5.I, a tool CS-T is used, which is capable of screen tracking to capture screen content SCR-C in real-time and to capture user input UI on a screen 2 of a PACS system.

In step 5.II it is detected, for example by OCR, which study ST or patient P is currently opened on the screen 2. The detection is realized by monitoring a particular region of the captured screen layout, in which a patient ID P-ID and/or an accession number ACN is displayed, or by extracting these data points from the full captured screen by applying additional image processing techniques.

In step 5.III, it is classified based on the captured screen layout, which screen portions SCR-P correspond to which image segments IS. For example, (x,y)-coordinates of bounding boxes defining viewports are determined.

In step 5.IV, it is identified for each identified image segments IS, which image IM the user is currently visualizing and is eventually active on. This is done either by analysing the metadata displayed in the corners of this viewport or by cross correlating the pixel data with a set of images of this patient known by an external application. For example, the image IM is identified as an image of the lung of the patient P. Further, also the slice number SN as well as a series number SE of a study ST are identified.

In step 5.V, data D-EXT, for example annotation data, from an external data source 5 are selected, which are assigned to the determined information, for example an image IM of the lung. The external data D-EXT comprises AI results and the step of selecting the external data D-EXT from the external data source 5 comprises searching the external data source 5 for AI results which correspond to the determined content. For example, AI results are requested which are identified by the image series SE, slice SN and study ST.

In step 5.VI, the selected data D-EXT are displayed complementary to the displayed information such that the selected data do not conceal the displayed information.

For the complementary display, as shown in FIG. 4, an overlay OL on top of the medical image, shown on the PACS monitor 2, but independently of the display system of the PACS can be used. The medical image data displayed on the PACS monitor 2 can be understood as a first application window. Then, the overlay OL is realised as a second application window which is at least partly transparent. The second application window is presented in foreground overlapping with the PACS application window on the PACS monitor 2. The overlay is registered with the medical image of the PACS such that the results depicted by the overlay are located at corresponding positions of the displayed medical image. Hence, the registration comprises an adaption of the position and the size of the overlay OL to the underlying image. The overlay is generated in a way to maximize usability using appropriate colours or styles that make the result well distinguishable from the original image. Another (less-integrate) option, as stated in FIG. 3, is to display results in a separate window that is not overlapping with the detected images.

Figure 6:
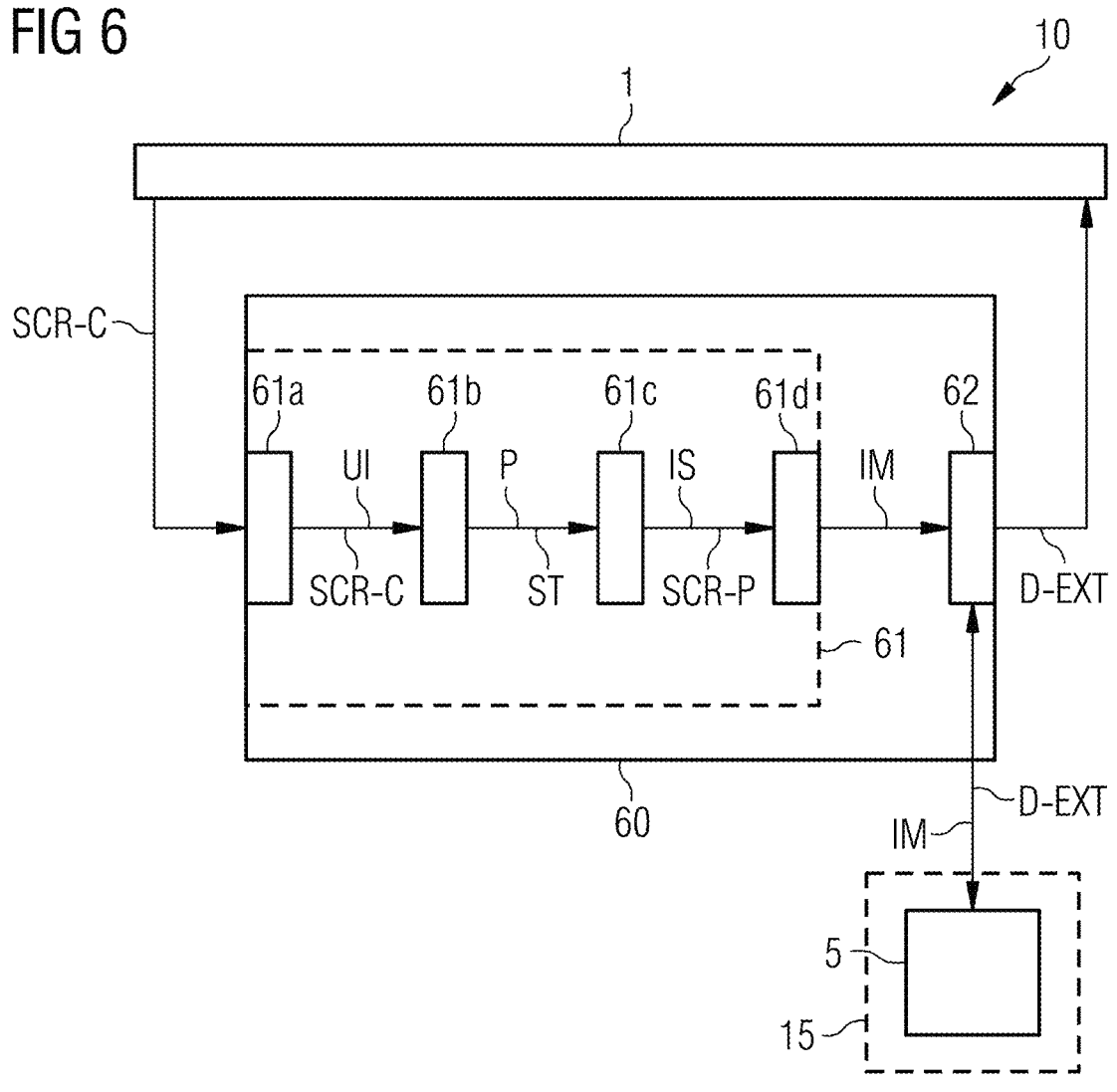
FIG. 6 shows a schematic view on a medical data analysis system data comprising an exchange device according to an embodiment of the present invention.

In FIG. 6, a schematic view on a medical data analysis system 10, i.e. an arrangement comprising a data exchange device 60 according to an embodiment of the present invention, an integrated medical data display system 1 and an evaluation unit 15 with an external data source 5, is illustrated. The data exchange device 60 comprises a determination unit 61 for determining information displayed on a screen 2 of an integrated medical data display system 1 by tracking the screen 2.

The determination unit 61 comprises a screen capture sub-unit 61*a* which is capable of screen tracking to capture screen content SCR-C in real-time and to capture user input UI.

Further, the determination unit 61 comprises a text recognition sub-unit 61*b* which detects by OCR or other text recognition techniques, which study ST or patient P is currently opened on the screen. The detection is realised by monitoring a particular region of the captured screen layout in which a patient ID P-ID and/or accession number ACN (not shown in FIG. 6) is displayed, or by extracting these data points from the full captured screen.

Furthermore, the determination unit 61 comprises a classification unit 61*c* which classifies based on the captured screen layout, which screen portions SCR-P correspond to which image segments IS. For example, (x, y)-coordinates of bounding boxes defining viewports are determined.

The determination unit 61 also comprises an identification unit 61*d* which identifies for each identified image segments IS which image IM the user is currently visualizing and is eventually active on. This is done either by analysing the metadata displayed in the corners of a viewport on a screen or by cross correlating the pixel data with a set of images of this patient known by an external application which is symbolised in FIG. 6 by an evaluation unit 15, applied on an external data source 5. For example, the image IM is identified as an image of the lung L of the patient P, with slice number SN and series SE.

The data exchange device 60 also comprises a selection unit 62 for selecting or filtering data D-EXT from the external data source 5 assigned to the determined information IM.

The data exchange device 60 then sends the selected data D-EXT to the integrated medical data display system 1 for displaying the selected data complementary to the displayed information. For example, the selected data D-EXT are shown on a PACS viewer 2 as an overlay OL, as depicted in FIG. 4 or on a separated second screen 3 as depicted in FIG. 3.

The data exchange device 60 can be a (personal) computer, a workstation, a virtual machine running on host hardware, a microcontroller, or an integrated circuit. In particular, the data exchange device 60 can be a mobile device, e.g., a smartphone or a tablet. As an alternative, the data exchange device 60 can be a real or a virtual group of computers (the technical term for a real group of computers is "cluster", the technical term for a virtual group of computers is "cloud").

Figure 7:
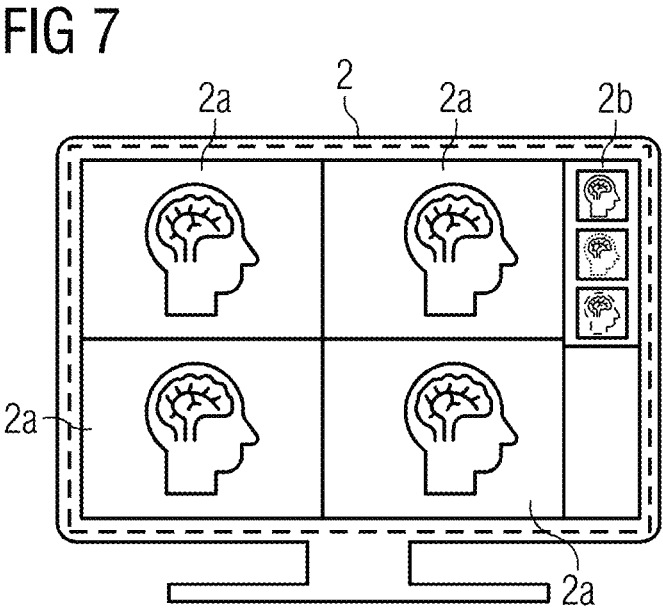
FIG. 7 shows a schematic view on a screen of a PACS system, wherein screen capture is used to track screen content in real-time.

In general, the determination unit 61, the selection unit 62 and the extraction unit 63 can comprise hardware elements and software elements, for example a microprocessor, a CPU (acronym for "central processing unit"), a GPU (acronym for "graphical processing unit"), a field programmable gate array (an acronym is "FPGA") or an ASIC (acronym for "application-specific integrated circuit"). The determination unit 61, the selection unit 62 and the extraction unit 63 can be configured for multithreading, i.e., the determination unit 61, the selection unit 62 and the extraction unit 63 can host different computation processes at the same time, executing them either in parallel or switching between active and passive computation processes. In particular, the determination unit 61, the selection unit 62 and the extraction unit 63 can be a combination of several hardware and software elements, in particular, the determination unit 61, the selection unit and the extraction unit 63 can comprise one or more determination units respectively selection units respectively extraction units as subcomponents. FIG. 7 shows a schematic view on a screen 2 of a PACS system, wherein screen capture is used to track screen content in real-time. FIG. 7 is referred to a second embodiment of the present invention, which relates to an appropriate positioning of content of an external data source 5 (not shown in FIG. 7) on a screen 2 of a PACS system. For example, the screen 2 in FIG. 7 comprises four viewports and in the upper right corner a field 2*b* for displaying metadata like, in this example, image thumbnails.

Figure 8:
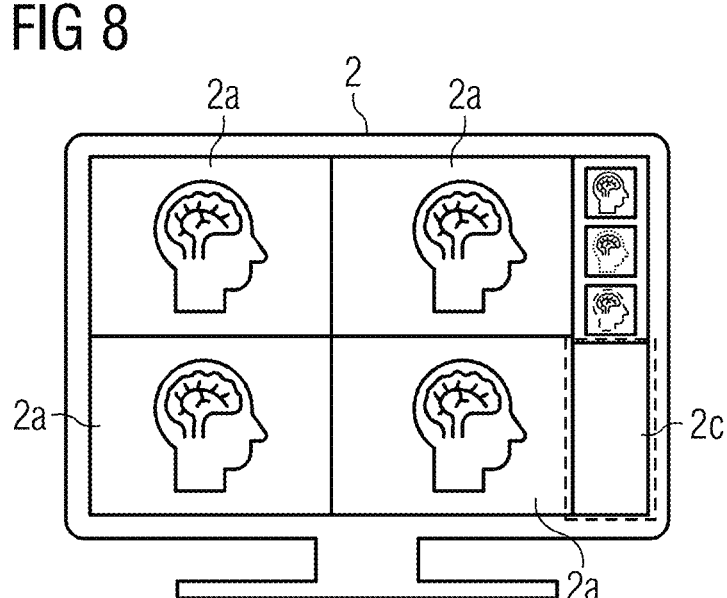
FIG. 8 shows a schematic view on the screen depicted in FIG. 7, wherein a region of least interest is determined in the screen.

FIG. 8 shows a schematic view on the screen 2 depicted in FIG. 7, wherein a region 2*c* of least interest is determined in the screen 2. Based on the information captured from the screen 2 by screen capture, corner locations and borders are detected. This can be done via a learning-based approach. Another alternative can be based on convolutional processing. There are for example well-known specific kernels that enable the detection of horizontal and vertical lines of different width, which can be used by thresholding to retrieve the different viewports and areas on the screen 2. The detection of regions 2*c* of least interest can also be realized interactive. For example, a first screenshot can be used for capturing the overall structure of the used screen 2 and the user is requested, using some user interface, to define regions on this image that could be considered as a region 2*c* of least interest. The request can be done in advance for a set of common layouts that will then be persisted.

Figures 9, 10:
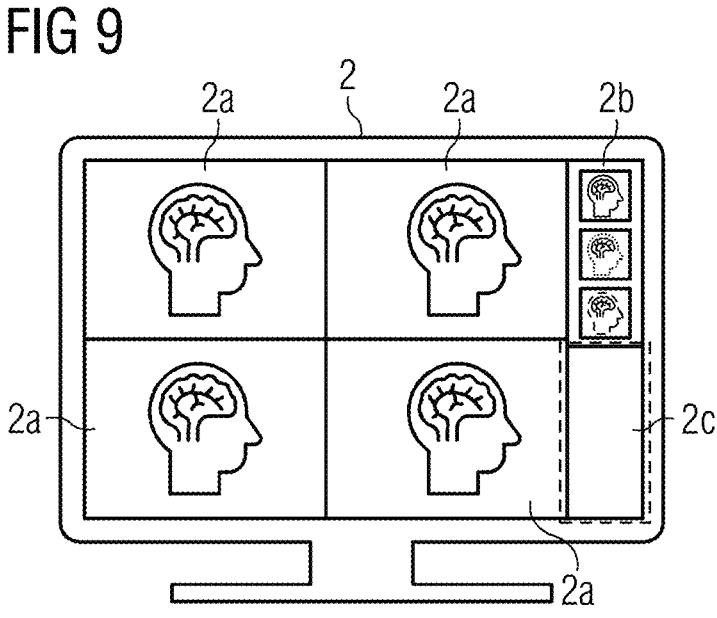
FIG. 9 shows a schematic view on the screen depicted in FIG. 7 and FIG. 8, wherein it is determined if the region is suited for display of an external content window.
FIG. 10 shows a schematic view on the screen depicted in FIG. 7 to FIG. 9, wherein the external content window is displayed over the suitable region of least interest.

In FIG. 9, a schematic view on the screen 2 depicted in FIG. 7 and FIG. 8 is shown, wherein it is determined if the region 2*c* of least interest is suited for displaying an external content window ECW (depicted in FIG. 10). Eventually, a resizing is performed to fit this space and display correctly. A successful resizing can be achieved easily with a responsive design of the application and with a resizing of the respective container window. If several candidate positions are available, the optimal position can be chosen based on the best size fit though, or based on a ranking of the different candidates relying on diverse metrics like aspect-ratio fit of the window to display, content type that would be hidden if placing a window at a particular position, etc.

FIG. 10 shows a schematic view on the screen 2 depicted in FIG. 7 to FIG. 9, wherein the external content window ECW is displayed over the suitable region 2c of least interest.

Figures 11, 12:
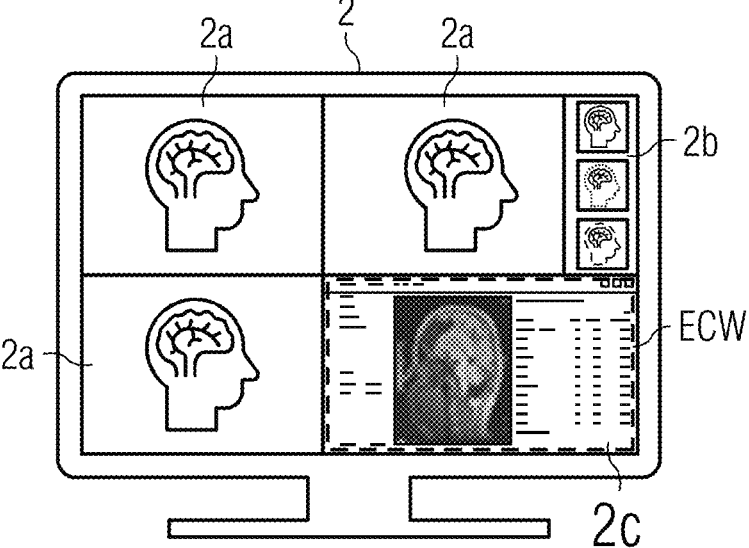
FIG. 11 shows a schematic view on a screen of a PACS system, wherein a region of least interest in the screen is determined.
FIG. 12 shows a schematic view on the screen depicted in FIG. 11, wherein an external content window is displayed over the suitable region of least interest.

In FIG. 11, a schematic view on a screen 2 of a PACS system is shown, wherein a region 2c of least interest in the screen 2 is determined, which extents additionally onto a neighboured viewport.

In FIG. 12, a schematic view on the screen 2 depicted in FIG. 11, is illustrated, wherein an external content window ECW is displayed over the suitable region 2c of least interest, which is extended enough to show an annotated image of a currently depicted sectional head image.

Figure 13:
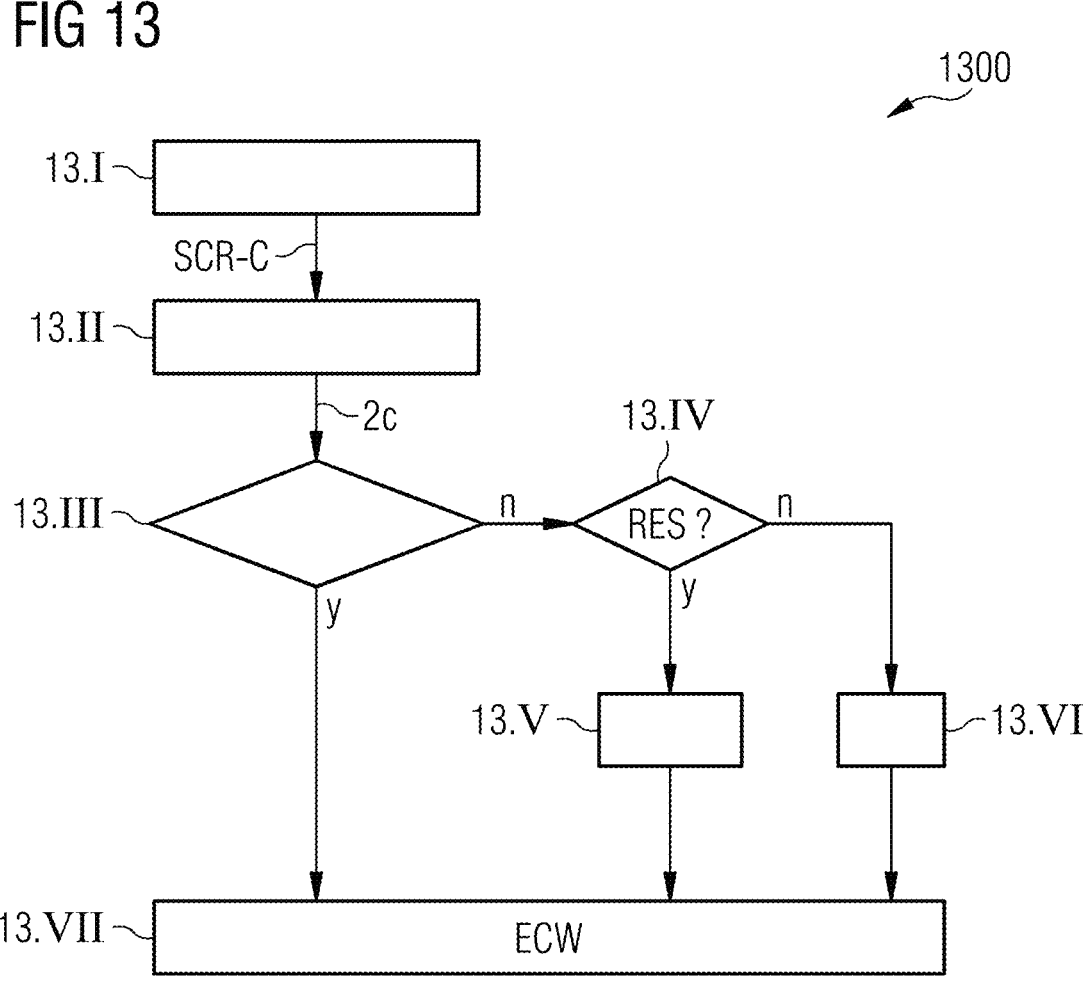
FIG. 13 shows a flow chart diagram illustrating the method for exchanging data between an external data source for annotation data and an integrated medical data display system according to a second embodiment of the present invention.

FIG. 13 shows a flow chart diagram 1300 illustrating the method for exchanging data between an external data source for annotation data and an integrated medical data display system according to a second embodiment of the present invention.

In step 13.I, a screen capture method is used to track screen content SCR-C in real-time. Screen capture is done for detecting an appropriate position for displaying content of the mentioned external data source on a screen 2 of a PACS system (shown in FIG. 7 to FIG. 12).

In step 13.II, a region 2c of least interest is determined in the screen 2. Based on the information captured from the screen 2 by screen capture, corner locations and borders are detected. This can be done via a learning-based approach.

In step 13.III, it is determined if the region 2c of least interest is suited for display of an external content window ECW. If that is the case, which is symbolized with "y", the method continues with step 13.VII. In case the size does not suit, which is symbolized with "n", it is determined in step IV, if resizing RES is possible. If resizing RES is possible, which is symbolized in FIG. 13 with "Y", a resizing is performed in step 13.V to fit this space and display correctly.

If resizing RES is not possible or feasible, which is symbolized in FIG. 13 with "n", e.g. because the resulting resized window would be too small or below a certain threshold size, too distorted, etc., then, in step 13.VI, the decision can be taken automatically to display the content on a separate monitor, by explicitly hiding content, while acknowledging that better readability would be obtained for the content displayed in the external window.

In step 13.VII, an external content window ECW is displayed over the suitable region 2c of least interest or on a separate monitor depending on the decisions of step 13.III and 13.IV.

Figure 14:
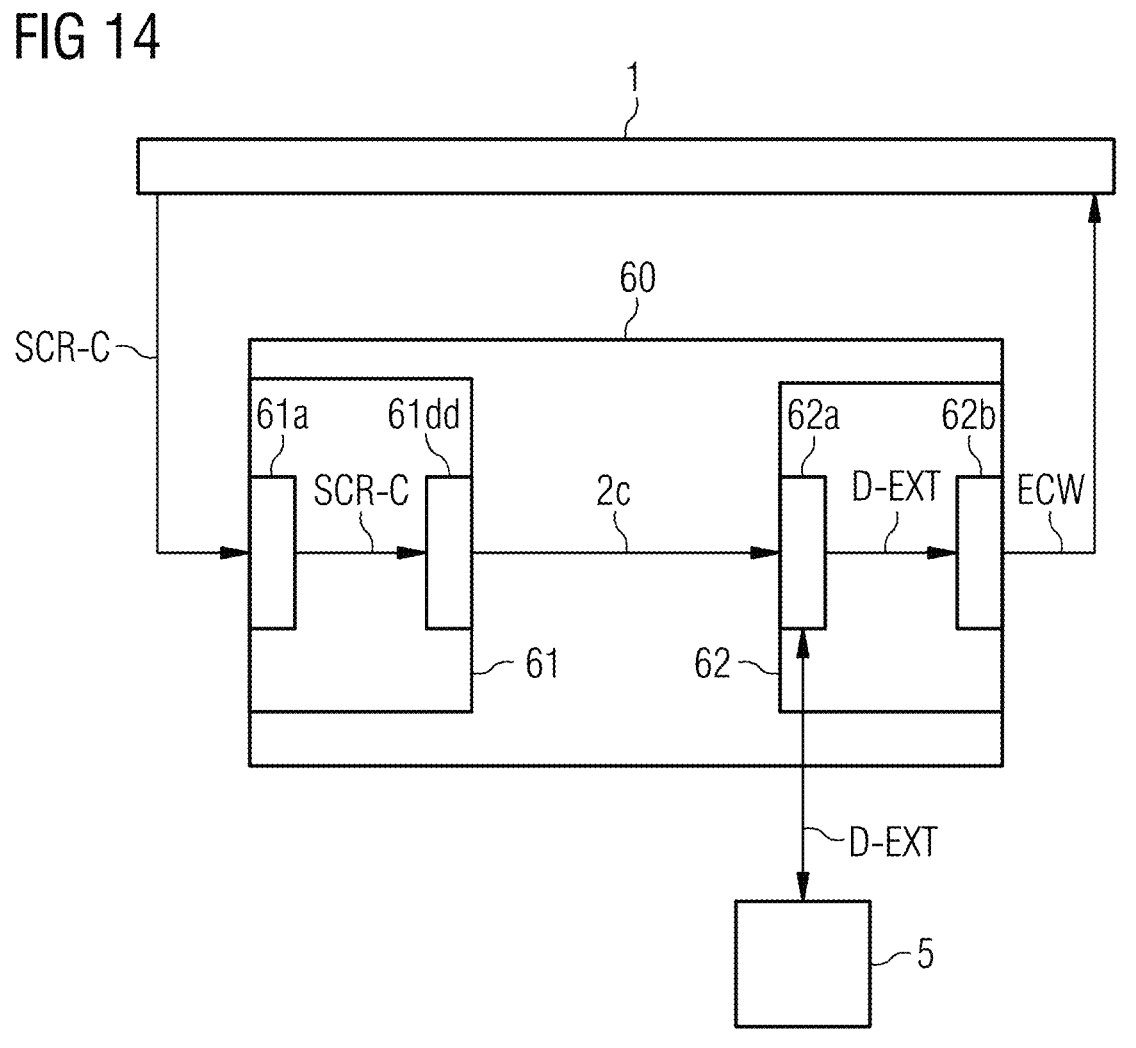

In FIG. 14, a schematic view on a medical data analysis system 10, comprising a data exchange device 60 and an integrated medical data display system 1 according to a second embodiment of the present invention is illustrated.

The data exchange device 60 comprises a determination unit 61 for determining information displayed on a screen 2 (not shown) of the integrated medical data display system 1 by tracking the screen 2.

The determination unit 61 comprises a screen capture sub-unit 61a which is capable of screen tracking to capture screen content SCR-C in real-time.

Further, the determination unit 61 comprises a location detection unit 61dd for detecting a region 2c of least interest in the screen. Based on the information captured from the screen 2 by screen capture, corner locations and borders are detected. This can be done via a learning-based approach.

The data exchange device 60 also comprises a selection unit 62 for selecting data D-EXT from the external data source 5 for displaying these data D-EXT in an external content window ECW. The selection unit 62 comprises a selection sub-unit 62a for retrieving data D-EXT from the external data source 5 and a formation unit 62b for resizing the retrieved data D-EXT such that it suits the region 2c of least interest and for positioning an external content window ECW comprising the retrieved data D-EXT in the region 2c of least interest.

Further, the external content window ECW is transmitted to the integrated medical data display system 1 for displaying the external content window ECW at the determined region 2c.

Alternatively, only the data necessary to position and display the external content window ECW correctly are transmitted. For example, not the full window ECW itself is transmitted, but only some parameters like "ECW corner positions", "ECW width", "ECW height", "ECW centre", etc. are transmitted so that the window ECW knows, how to position itself based on these received parameters.

Figure 15:
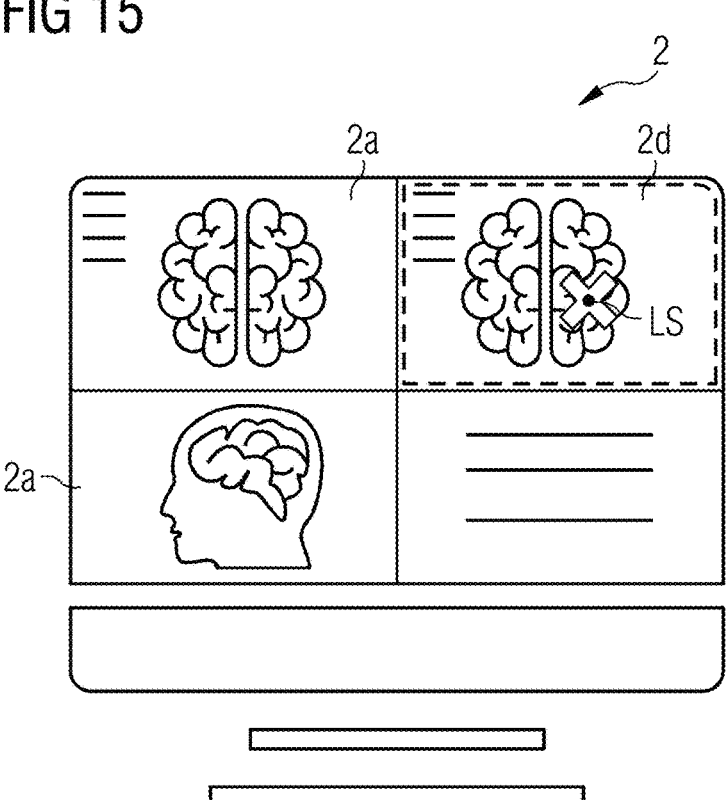
FIG. 15 shows a schematic view on a screen of a PACS, wherein a reference frame is determined.

FIG. 15 shows a schematic view on a screen 2 of a PACS, wherein a reference frame 2d is determined on the screen 2. In the third embodiment, a user input into the image viewer 2 which is an annotated lesion LS is captured by a screen tracking tool on the screen 2 in the upper right viewport determined by the reference frame 2d. Also additional viewports 2a are depicted in FIG. 15, which are not selected.

For this object, a frame 2d of reference is autodetected. For this purpose, the workflow is usually sufficiently standardized to preconfigure a particular window on a split screen that is always used to annotate series. Alternatively, a particular window can also be autodetected by for example analysing displayed metadata like series descriptions which are usually displayed as overlay on the images.

Figure 16:
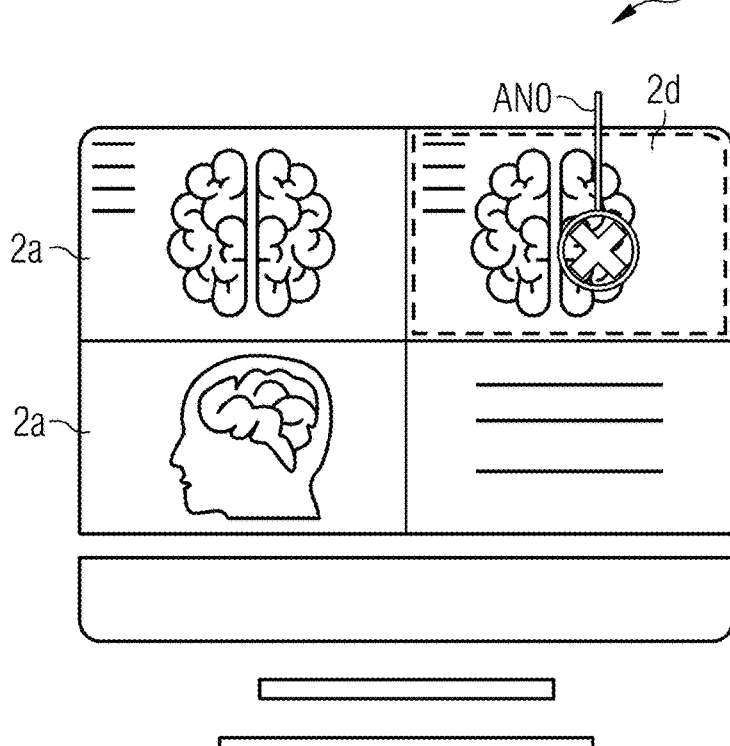
FIG. 16 shows a schematic view on the screen depicted in FIG. 15, wherein an annotation is detected.

FIG. 16 shows a schematic view on the screen 2 depicted in FIG. 15, wherein an annotation ANO is detected in the detected frame 2d. Detection of user markings, i.e. annotations ANO, can be realized based on rgb values. Alternatively, image content can be subtracted from the unannotated image to see largest deviation and therefore compute a mask of the annotation ANO. Annotations ANO can be of different types, for example, but not limited to lines, simple or perpendicular, rectangular, circular or ellipsoidal bounding boxes (regions of interest) or crosshairs.

Figure 17:
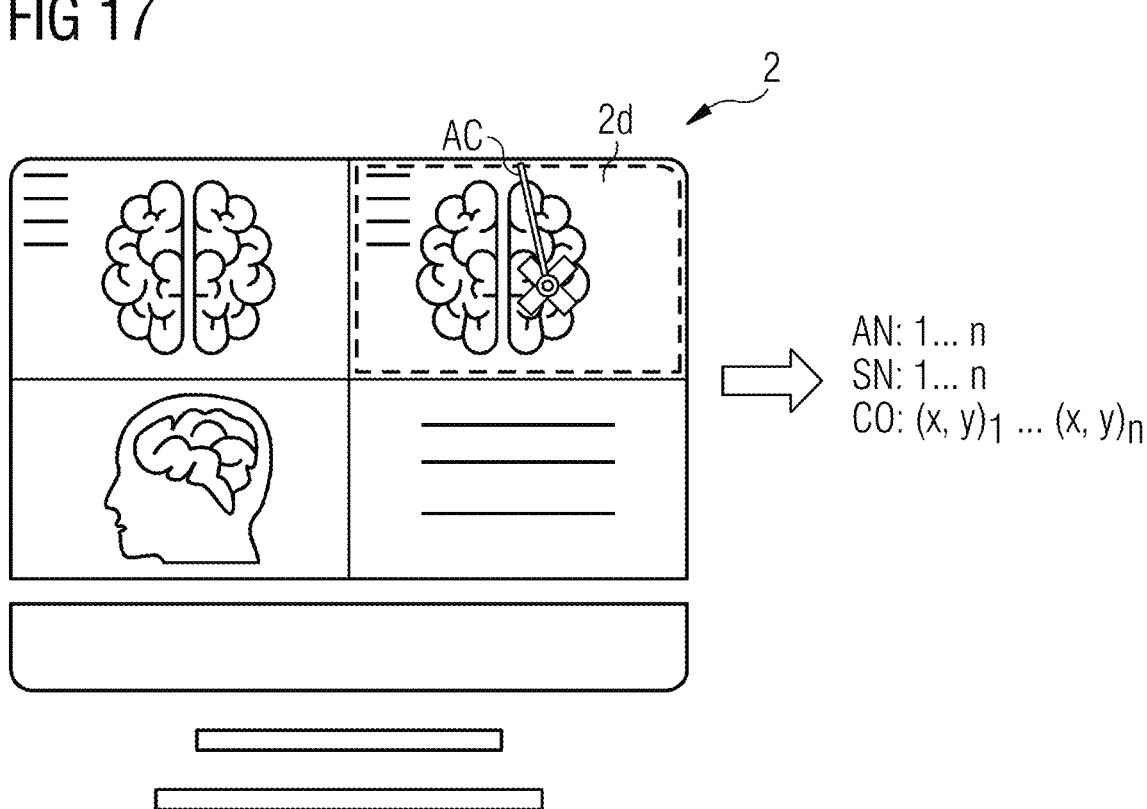
FIG. 17 shows a schematic view on the screen depicted in FIG. 15 or 16, wherein an annotation centre is determined and localized.

FIG. 17 shows a schematic view on the screen 2 depicted in FIG. 15 or 16, wherein an annotation centre AC is determined and localized. For example coordinates CO of the annotation mark AN are determined. Depending on the annotation types, it may be useful to determine and persist more than just the centre of an annotation, for example to determine more than one coordinate point per annotation. For example, for a crosshair, the centre can be determined, but also the maximum diameter or the coordinates of the two lines making of the crosshair.

For a circular annotation, as another example, the centre of the circle and an approximate radius or diameter of the circle can be determined. The determination of the approximate location of the annotation using the centre is, however, the minimum requirement and that can be sufficient for some application. Further, for every captured mark ANO, annotation identifier AN, corresponding slice number SN and corresponding x- and y-coordinates CO in pixels are saved and sent to a remote location. This new captured annotation data might be transmitted encrypted so that the gained knowledge is not exposed to third-party systems without explicit permission.

Figure 18:
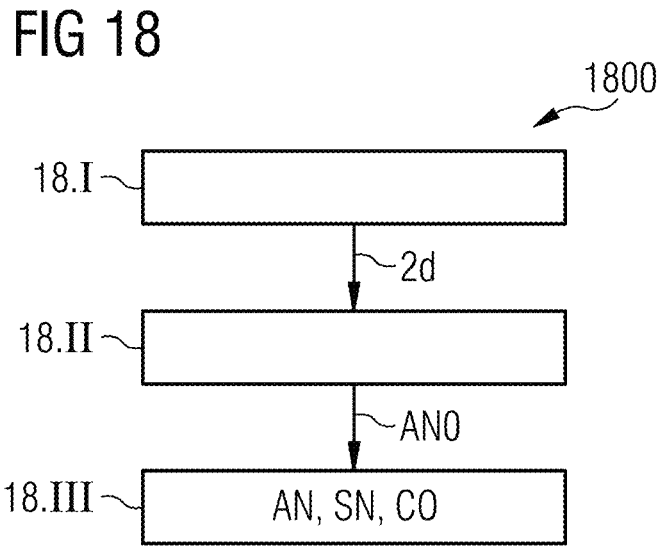
FIG. 18 shows a flow chart diagram illustrating the method for exchanging data between an external data source for annotation data and an integrated medical data display system according to a third embodiment of the present invention.

FIG. 18 shows a flow chart diagram illustrating the method for exchanging data between an external data source and an integrated medical data display system according to a third embodiment of the present invention.

In step 18.I, a screen capture tool is used to track screen content SCR-C in real-time. Screen capture is done for detecting a reference frame 2d.

In step 18.II, an annotation ANO is detected in the detected frame 2d. As mentioned-above, detection of user markings, i.e. annotations ANO can be realised based on rgb values. Alternatively, image content can be subtracted from unannotated image to see largest deviation and therefore compute a mask of the annotation ANO.

In step 18.III an annotation centre AC is determined and localized. Further, coordinates CO of the annotation mark ANO are determined. Furthermore, for every captured mark AN, annotation identifier AN, corresponding slice number SN and corresponding x- and y-coordinates CO in pixels are saved and sent to a remote location.

Figure 19:
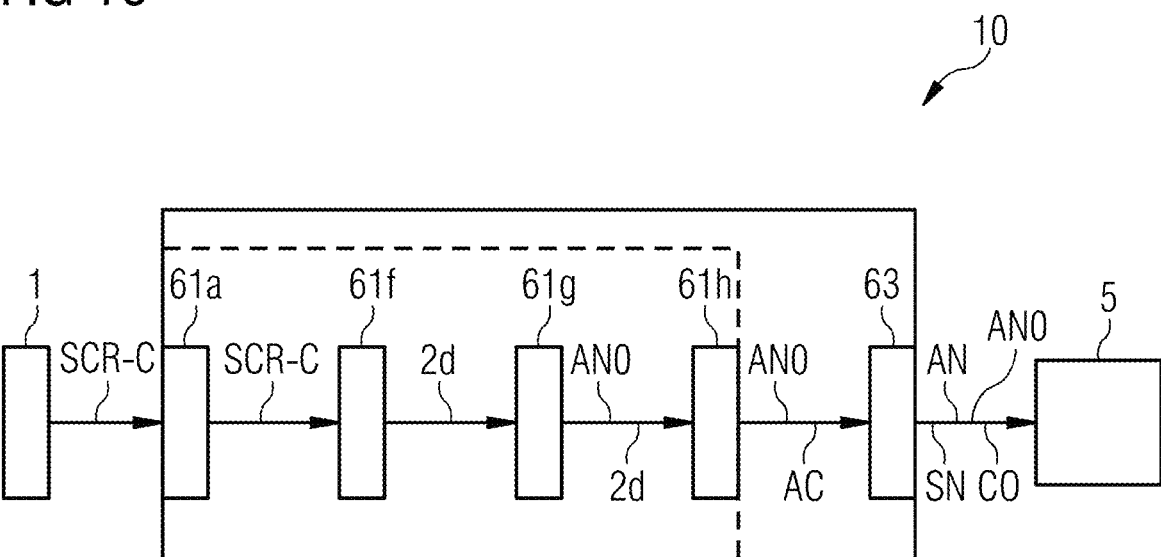
FIG. 19 shows a schematic view on a medical data analysis system comprising a data exchange device according to a third embodiment of the present invention.

FIG. 19 shows a schematic view on a medical data analysis system 10 comprising a data exchange device 60 according to a third embodiment of the present invention.

The data exchange device 60 comprises a determination unit 61 for determining information SCR-C displayed on a screen 2 of an integrated medical data display system 1 by tracking the screen 2.

The determination unit 61 comprises a screen capture sub-unit 61a which is capable of screen tracking to capture screen content SCR-C in real-time.

Further, the determination unit 61 comprises a reference frame detection unit 61f for detecting a reference frame 2d based on the captured screen content SCR-C.

Furthermore, the determination unit 61 comprises an annotation detection unit 61g for detecting annotations ANO in the detected frame 2d.

Furthermore, the determination unit 61 comprises an annotation centre detection unit 61h for determining an annotation centre AC and localizing the annotation centre AC. Depending on annotation type, also other types of landmarks can be determined, for example "centre+extremities" or "centre+radius".

The data exchange device 60 also comprises an annotation addition unit 63 for determining for every annotation ANO an annotation number AN, corresponding slice number SN and corresponding x- and y-coordinates CO in pixels and saving the additional annotation data ANO in an external data source 5.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The above descriptions are merely preferred embodiments of the present disclosure, but not intended to limit the present disclosure, and any modifications, equivalent replacements, improvements, etc. made within the spirit and principle of the present disclosure, should be included within the scope of protection of the present disclosure.

Further, the use of the undefined article "a" or "one" does not exclude that the referred features can also be present several times. Likewise, the term "unit" or "device" does not exclude that it consists of several components, which may also be spatially distributed.

What is claimed is:

1. A method for exchanging data between an external data source for annotations and an integrated medical data display system, the method comprising:
   determining information displayed on a screen of the integrated medical data display system by capturing the screen, the information displayed on the screen including formal information about a format of displayed data, the formal information including a screen layout with a delimited screen portion including an image segment and a second screen portion not containing the image segment;
   selecting data from the external data source assigned to the information displayed on the screen;
   displaying the selected data as complementary to the information displayed on the screen by showing the selected data in an external window opened next to the integrated medical data display system; and
   displaying an external application window within the second screen portion.

2. The method according to claim 1, wherein the information displayed on the screen further comprises at least one of:
   content of medical data, or
   non-image information including patient metadata or examination metadata.

3. The method according to claim 1, wherein
   the external data source includes results, and
   the selecting data from the external data source includes searching the external data source for results corresponding to the information displayed on the screen, wherein the selected data includes the results.

4. The method according to claim 1, wherein the determining the information displayed on the screen of the integrated medical data display system comprises:
   detecting a reference frame based on the information displayed on the screen, and
   detecting annotations in the reference frame based on the information displayed on the screen.

5. The method of claim 1, wherein the format of the displayed data includes information about a shape and size of displayed structures including windows and sub-windows of the screen.

6. The method according to claim 1, wherein the determining the information displayed on the screen comprises:
   determining corner locations or borders of displayed viewports on the screen based on the screen layout.

7. The method according to claim 6, wherein the determining the information displayed on the screen comprises:
   using a metric to determine at least one screen portion as a monitor segment of least-interest based on the information displayed on the screen, and
   displaying a further external application window within the monitor segment of least-interest.

8. The method according to claim 7, wherein in case a plurality of monitor segments of least-interest are determined, a position for the further external application window is chosen at least one of based on a best size fit between the external application window and the plurality of monitor segments of least-interest, based on an aspect ratio fit between the external application window and the plurality of monitor segments of least-interest, or overlapping the external application window with images of the integrated medical data display system, in response to no monitor segment of least interest that fits the external application window being found.

9. The method according to claim 1, wherein the formal information further includes at least one of:

the screen layout including at least one further screen portion, each further screen portion including at least one of a viewport or a further delimited screen portion including the image segment, or user input to the integrated medical data display system.

10. The method according to claim 9, wherein the determining the information displayed on the screen further comprises:

determining at least one active viewport using mouse activity tracked using screen capture.

11. The method according to claim 9, wherein the determining the information displayed on the screen comprises at least one of:

using a tool capable of screen tracking to capture screen content, detecting which study or patient is currently displayed on the screen, classifying, based on the screen layout, which screen portion corresponds to which image segment, and identifying, for each classified image segment, which image a user is at least one of currently visualizing or active on, or identifying a window level the user is working with for a particular slice.

12. The method according to claim 11, wherein the determining the information displayed on the screen comprises:

determining corner locations or borders of displayed viewports on the screen based on the screen layout.

13. The method according to claim 11, wherein the determining the information displayed on the screen further comprises:

determining at least one active viewport using mouse activity tracked using screen capture.

14. The method according to claim 11, wherein the external data source includes results, and the selecting data from the external data source includes searching the external data source for results corresponding to the information displayed on the screen, wherein the selected data includes the results.

15. The method according to claim 14, wherein the displaying the selected data comprises:

generating an overlay on the information displayed on the screen of the integrated medical data display system, wherein the overlay includes annotations corresponding to the information displayed on the screen, and the overlay is registered with the information displayed on the screen.

16. A data exchange device for exchanging data between an external data source for annotations and an integrated medical data display system, the data exchange device comprising:

a determination unit configured to determine information displayed on a screen of the integrated medical data display system by capturing the screen, the information displayed on the screen including formal information about a format of displayed data, the formal information including a screen layout with a delimited screen portion including an image segment and a second screen portion not containing the image segment, wherein the second screen portion includes an external application window; and a selection unit configured to select data from the external data source assigned to the information displayed on the screen and display the selected data as complementary to the information displayed on the screen, by showing the selected data in a particular external window that is opened next to the integrated medical data display system.

17. A non-transitory computer-readable medium comprising instructions that, when executed by a computer, cause the computer to carry out the method of claim 1.

18. A data exchange device for exchanging data between an external data source for annotations and an integrated medical data display system, the data exchange device comprising:

a memory storing computer executable instructions; and at least one processor configured to execute the computer executable instructions to cause the data exchange device to determine information displayed on a screen of the integrated medical data display system by capturing the screen, the information displayed on the screen including formal information about a format of displayed data, the formal information including a screen layout with a delimited screen portion including an image segment and a second screen portion not containing the image segment, select data from the external data source assigned to the information displayed on the screen, display the selected data as complementary to the information displayed on the screen by showing the selected data in an external window opened next to the integrated medical data display system, and display an external application window within the second screen portion.

\* \* \* \* \*